US011873369B2

(12) United States Patent
Tian et al.

(10) Patent No.: US 11,873,369 B2
(45) Date of Patent: Jan. 16, 2024

(54) POLYMERS BASED ON DIISOALKENYLARENES AND USES THEREOF

(71) Applicant: Kraton Polymers LLC, Houston, TX (US)

(72) Inventors: Jason Tian, Houston, TX (US); Ruidong Ding, Houston, TX (US); Chad Reiter, Savannah, GA (US)

(73) Assignee: KRATON CORPORATION, Houston, TX (US)

( * ) Notice: Subject to any disclaimer, the term of this patent is extended or adjusted under 35 U.S.C. 154(b) by 2 days.

(21) Appl. No.: 17/644,146

(22) Filed: Dec. 14, 2021

(65) Prior Publication Data
US 2022/0195109 A1    Jun. 23, 2022

Related U.S. Application Data

(60) Provisional application No. 63/130,130, filed on Dec. 23, 2020.

(51) Int. Cl.
*C08G 61/02* (2006.01)
*C08J 5/24* (2006.01)

(52) U.S. Cl.
CPC ............... *C08G 61/02* (2013.01); *C08J 5/24* (2013.01); *C08G 2261/12* (2013.01); *C08G 2261/1412* (2013.01); *C08G 2261/1642* (2013.01); *C08G 2261/314* (2013.01); *C08G 2261/40* (2013.01); *C08J 2365/00* (2013.01)

(58) Field of Classification Search
CPC ............... C08G 61/02; C08G 2261/12; C08G 2261/1412; C08G 2261/1642; C08G 2261/314; C08G 2261/40; C08J 5/24; C08J 2365/00
See application file for complete search history.

(56) References Cited

U.S. PATENT DOCUMENTS

| | | | | |
|---|---|---|---|---|
| 5,350,604 A | * | 9/1994 | Crivello | C08F 12/34 525/289 |
| 2002/0132053 A1 | * | 9/2002 | McCarthy | C08G 61/00 427/372.2 |
| 2018/0171189 A1 | | 6/2018 | Ingratta et al. | |

OTHER PUBLICATIONS

Maier et al. Makromol. Chem. 192, 1969-1979 (1991).*
Nuyken, et al., "Cationic Polymerization of bis(1-alkyvinyl)benzenes and related monomers". Makromol. Chem and Physics, Wiley, vol. 193, Jan. 1, 1992 (Jan. 1, 1992), pp. 487-500, XP001105931, ISSN: 0025-116X, DOI: 10.1002/MACP.1992.021930220.

* cited by examiner

*Primary Examiner* — Shane Fang
(74) *Attorney, Agent, or Firm* — Beth Haslam

(57) ABSTRACT

Polymers are obtained by polymerizing in the presence of a Bronsted acid or a Lewis acid catalyst, a monomer comprising a 1,3-diisoalkenylarene, a 1,4-diisoalkenylarene, or mixtures thereof. The polymer comprises at least one of repeat units (A), (B), (C), and (D); wherein $R^1$ is H or a C1-C8 alkyl group.

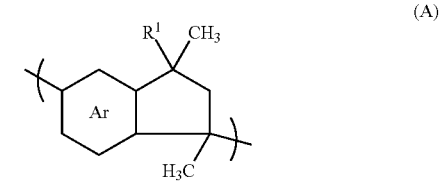

(A)

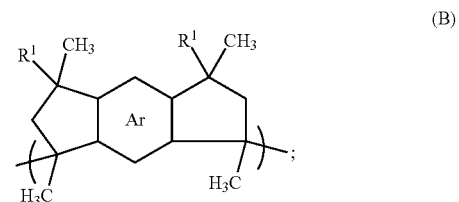

(B)

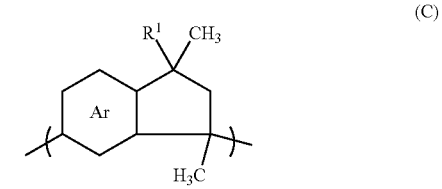

(C)

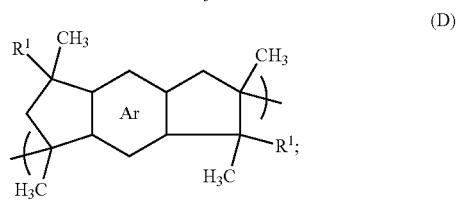

(D)

The polymers have high $T_g$ and exhibit good solubility in non-polar solvents, forming substantially gel-free solutions. The polymers are useful for producing crosslinked materials having good physical properties. The crosslinked materials are valuable for further downstream uses, such as copper clad laminates.

20 Claims, No Drawings

POLYMERS BASED ON DIISOALKENYLARENES AND USES THEREOF

RELATED APPLICATIONS

This application claims priority from U.S. Provisional Application No. 63/130,130 with a filing date of Dec. 23, 2020, the disclosure of which is incorporated herein by reference.

FIELD

The disclosure relates to polymers based on diisoalkenylarenes and their uses.

BACKGROUND

Low dielectric materials having electrical, thermal, chemical, and mechanical properties have been intensively researched. In many applications, the choice of low dielectric material with these properties have an effect on a device's performance and lifetime. The rapid development of the microelectronics industry has also spawned a demand for materials for such applications. The trend towards miniaturization of electronic components has also intensified the need for materials having optimal electrical and functional performance, e.g., a desirable combination of electrical, thermal, chemical, adhesive and mechanical properties.

A variety of polymers, e.g., poly(cyclohexadiene) homopolymer (PCHD) have been used for electronic applications. The material has been traditionally prepared by anionic polymerization of cyclohexadiene. However, the polymer generally has a narrow molecular weight distribution, i.e., polydispersity index, of <1.2, with poor solubility in non-polar solvents, e.g., aliphatic or aromatic hydrocarbon solvents. Poor solubility limits the use of the polymer in several downstream applications.

There is a need for polymers having a desirable combination of properties, such as solubility in non-polar solvents, good processability, as well as satisfactory thermal and electronic properties.

SUMMARY

In one aspect, a polymer is disclosed, having at least one of: repeat units (A), (B), (C) and (D):

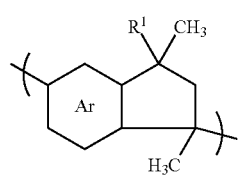

(A)

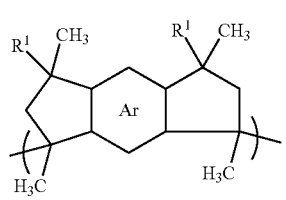

(B)

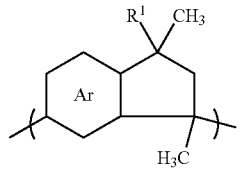

(C)

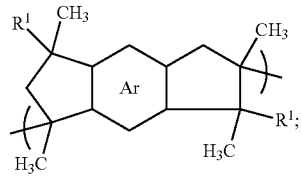

(D)

wherein R1 is H or a C1-C8 alkyl group. The polymer has a solubility in a hydrocarbon solvent at 25° C. of at least 10 wt. % and forms a substantially gel-free solution in a hydrocarbon solvent. The polymer has a $T_g$ of from 50° C. to 300° C., measured using DSC according to ASTM D3418.

In another embodiment, a polymer prepared by electrophilically polymerizing a monomer comprising a 1,3-diisoalkenylarene (I), a 1,4-diisoalkenylarene (II),

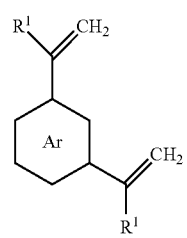

(I)

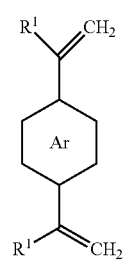

(II)

or mixtures thereof, is disclosed, wherein $R^1$ is H or a C1-C8 alkyl group. A Bronsted acid or Lewis acid catalyst is used for the polymerization. The polymer has a solubility in a hydrocarbon solvent at 25° C. of at least 10 wt. % and forms a substantially gel-free solution in a hydrocarbon solvent. The polymer has a $T_g$ of from 50° C. to 300° C., measured using DSC according to ASTM D3418.

In another aspect, the polymers further comprise structural units derived from a comonomer, which can be any compound capable of reacting with electrophilic species generated from the DIAEA in the presence of the Bronsted or Lewis acid catalyst. Examples include: (i) an aromatic compound having an olefinic group, (ii) a cyclodiene or a dimer thereof, (iii) a divinylarene other than the diisoalkenylarenes of formulas (I) or (II), (iv) an adduct of a 1,3-cyclodiene and an acylic diene, or any combinations of the comonomers (i)-(iv). Examples of comonomers of type (i) include styrene, α-methylstyrene, p-methylstyrene, and the like.

In still another aspect, a polymer composition obtained by polymerizing the monomer (I), (II), or combinations thereof, in the presence of a Bronsted or a Lewis acid, is disclosed. The polymer has a solubility in a hydrocarbon solvent at 25° C. of at least 10 wt. %, and a $T_g$ of from 50° C. to 300° C., measured using DSC according to ASTM D3418.

In another aspect, a curable composition is disclosed. The curable composition comprises the polymer having repeat units (A) and (B), (C) and (D), or combinations thereof; one or more rubbery polymers, one or more crosslinking agents, one or more curing initiators, and optionally one or more accelerants.

In yet another aspect, a cured composition formed from the curable composition is provided. The cured product has a good combination of one or more of a sufficient peel strength to copper, an adequately low dissipation factor (Df), an adequately low dielectric constant (Dk), and good fire retardancy.

The curable and cured compositions are valuable for further downstream uses, such as prepregs, copper clad laminates, electrical appliance housings, electrical cables, electrical connectors, electronic switches, and printed wiring boards.

DESCRIPTION

The following terms will be used throughout the specification and will have the following meanings unless otherwise indicated.

"At least one of [a group such as A, B, and C]" or "any of [a group such as A, B, and C]," or "selected from [A, B, and C], and combinations thereof" means a single member from the group, more than one member from the group, or a combination of members from the group. For example, at least one of A, B, and C includes, for example, A only, B only, or C only, as well as A and B, A and C, B and C; or A, B, and C, or any other all combinations of A, B, and C. In another example, at least one of A and means A only, B only, as well as A and B.

A list of embodiments presented as "A, B, or C" is to be interpreted as including the embodiments, A only, B only, C only, "A or B," "A or C," "B or C," or "A, B, or C."

$M_n$ refers to the number average molecular weight (MW) in g/mol. It can be measured with GPC using polybutadiene calibration standards having known number average molecular weights. $M_n$ is calculated according to:

$$M_n = \frac{\Sigma_i N_i M_i}{\Sigma_i N_i}$$

where $N_i$ is the number of molecules of molecular weight $M_i$. $M_n$ can be calculated using the gel permeation/size exclusion chromatography (GPC-SEC) method in ASTM D5296 (2005).

$M_w$ is the weight average molecular weight, calculated according to:

$$M_w = \frac{\Sigma_i N_i M_i^2}{\Sigma_i N_i M_i}$$

where $N_i$ is the number of molecules of molecular weight $M_i$. $M_w$ can be calculated using GPC-SEC described in ASTM D5296 (2005).

"Polydispersity index" or PDI=$M_w/M_n$, measuring MW distribution broadness.

"Substantially gel-free" is understood to denote a polymer containing <15 wt. %, or <10 wt. %, or <5 wt % of solid matter insoluble in a hydrocarbon solvent, e.g., toluene, cyclohexane, methyl-ethyl ketone (MEK), etc.

"DIAEA" refers to a 1,3-diisoalkenylarene, 1,4-diisoalkenylarene or combinations of the 1,3- and 1,4 isomers.

"DIPEB" refers to diisopropenylbenzene. For example, 1,3-DIPEB refers to 1,3-diisopropenylbenzene.

The notation:

indicates the arene ring of the DIAEA and includes unsubstituted and substituted diisoalkenylarenes.

"CHD" refers to cyclohexadiene monomer, which in embodiments consists of variable mixtures of the 1,3- and the 1,4-cyclohexadiene isomers.

"DVB" refers to divinyl benzene.

Df indicates "Dissipation Factor" or "loss tangent" (Df) and is a measure of loss rate of electrical energy in a dissipative system. Dk indicates Dielectric constant or permittivity.

"Decomposition onset temperature" means the temperature at which 10% of the polymer based on the DIAEA decomposes.

The disclosure refers polymers based 1,3- and 1,4-diisoalkenylarenes, formed by cationic polymerization. The polymer after curing, is useful for electronic applications.

Polymers Based on 1,3- and 1,4-Diisoalkenylarenes:

The polymer is formed by cationic polymerization of a DIAEA in the presence of a Lewis acid catalyst or a Bronsted acid catalyst. In embodiments, the polymer comprises at least one of repeat units (A), (B), (C) and (D) whose structures are shown below, where R1 is H or a C1-C8 alkyl group. The polymers can have any order of the repeat units (A)-(D), such as for example, CCCC, ABAB, BBDD, AABBAAAAB, AABABB, CCDDCCCDD, CCDDCBB, AAAABCCDD, CCAACCAA, etc.

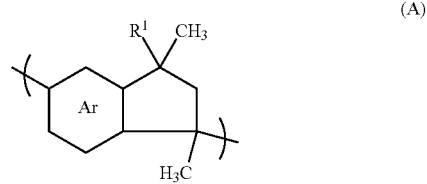

(A)

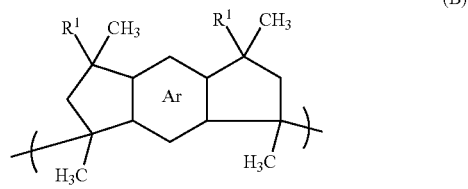

(B)

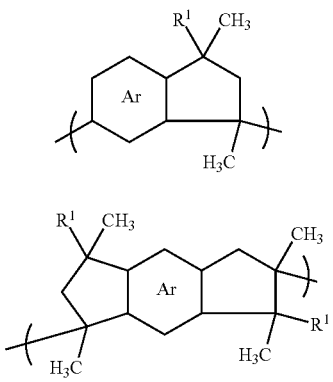

In embodiments, the polymer comprises at least one terminal group selected from (E), (F), (G) and (H), having structures shown below.

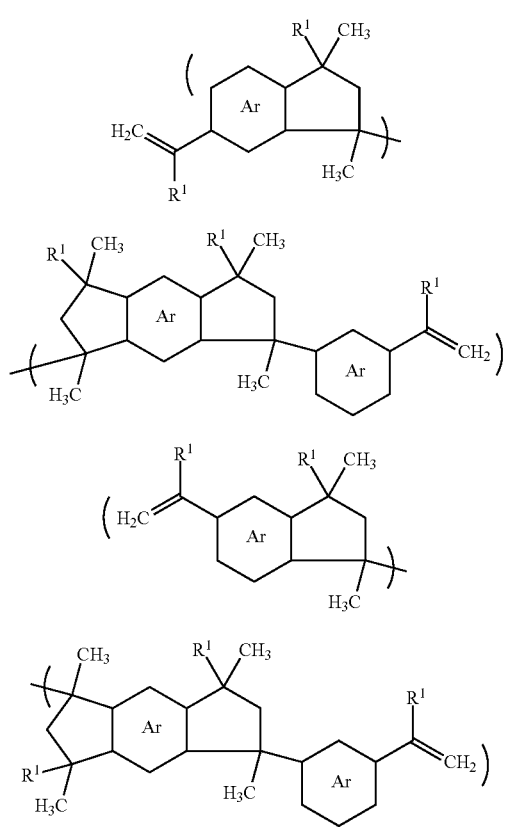

The polymerization can proceed via electrophilic reactive species, through a combination of a step growth process, involving intermediate structures such as for example (J) (where $R^1$ is methyl); and chain growth process, involving structures such as (K), where the squiggly bonds represent further extensions of the polymer chain. The two processes can be influenced by various factors, such as reaction temperature, solvent, monomer addition rate, and concentration of the unreacted monomer in the reaction mixture during polymerization.

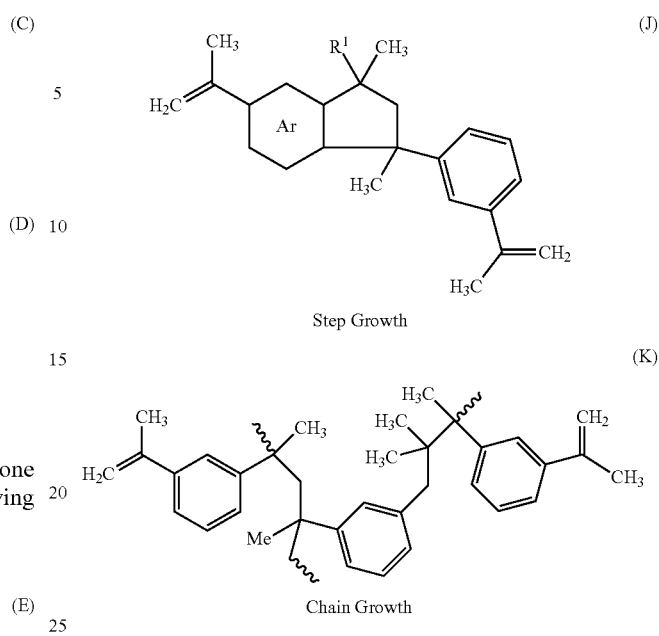

Non-limiting examples of DIAEAs to produce the polymers include the compounds having structures (I) 1,3-diisoalkenylarene, (II) 1,4-diisoalkenylarene, or mixtures thereof, wherein $R^1$ is methyl, ethyl, isopropyl, or n-butyl. Diisopropenylbenzenes (DIPEB) and their substituted variants can also be used. Examples of DIPEBs include but are not limited to: 1,3-diisopropenylbenzene; 1,2-diisopropenylbenzene; 1,3-diisopropenylbenzene; 1,4-diisopropenylbenzene; 3,4-dicyclohexyl-1,2-diisopropenyl-benzene; 5-(3-methyl-cyclopentyl)-1,3-diisopropenylbenzene; 3-cyclopentyl-methyl-6-n-propyl-1,4-diisopropenylbenzene; 4-(2-cyclo-butyl-1-ethyl)-1,2-diisopropenylbenzene; 3-(2-n-propylcyclopropyl)-1,4-diisopropenylbenzene; 2-methyl-5-n-hexyl-1,3-diisopropenylbenzene; 4-methyl-1,2-diisopropenylbenzene; 5-ethyl-1,3-diisopropenylbenzene; 3-methyl-1,4-diisopropenylbenzene; and the like. 1,3-diisopropenylbenzene is preferred.

The polymers based on the DIAEAs can further comprise repeat units derived from another polymerizable comonomer. Any polymerizable comonomer capable of aiding both the chain growth and step growth processes can be used. In embodiments, the comonomer can include without limitation: (i) a cyclodiene or a dimer thereof, (ii) a divinylarene other than the diisoalkenylarene of formulas (I), (II) or combinations thereof; (iii) an adduct of a cyclodiene and an acyclic diene, (iv) an allyl compound having two or more allyl groups, (v) a vinyl compound other than the divinylarene (ii) and having two or more vinyl groups, or any combination or sub-combination thereof.

In embodiments, the cyclodiene is cyclohexadiene (CHD), which can comprise varying amounts of isomers cyclohexadienes. Suitable examples of CHD include 1,3-CHD and 1,3-CHD containing minor amounts of 1,4-CHD.

When 1,3-CHD undergoes cationic polymerization, the product can contain both 1,2-addition units (Formula III) and 1,4-addition units (Formula IV) derived from CHD, where "Pol" stands for polymer chain. 1,4-addition is generally favored over 1,2-addition.

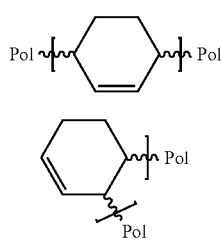

The 1,4- to 1,2-relative ratio can be modified by varying the catalyst and reaction conditions. In embodiments, the PCHD comprises 1,4-addition units and 1,2-addition units of CHD in a relative mole ratio of from 90:10 to 20:80.

In embodiments, the copolymer has repeat units derived from a DIPEB, including but not limited to 1,3-diisopropenyl benzene (1,3-DIPEB), and 1,3-CHD. Non-limiting examples of the cyclodiene include a cyclohexadiene, such as 1,3-cyclohexadiene, 1,4-cyclohexadiene, or mixtures thereof; a cyclopentadiene, such as 1,3-cyclopentadiene, alkyl cyclopentadiene, or mixtures thereof. Suitable examples of a divinylarene other than the DIAEAs include divinylbenzene.

Dimers of the 1,3-cyclodiene, such as for example, a Diels-Alder adduct formed from 2 molecules of the cyclodiene, e.g., dicyclopentadiene, can also be used as comonomers. Alternately, the comonomer can be an adduct of a 1,3-cyclodiene and an acyclic diene, such as for example, vinyl norbornene, ethylidene norbornene, or the Diels Alder adduct of cyclopentadiene and isoprene.

Examples of allyl compounds having two or more allyl groups includes, for example, allyl ethers, such as diallyl ether of pentaerythritol, triallyl ether of pentaerythritol, and tetraallyl ether of pentaerythritol, tetraallyl orthosilicate, and aromatic compounds having two or more allyloxy substituents.

Examples of vinyl compounds other than divinylarenes and having two or more vinyl groups include vinylsilanes, such as vinyltriisopropenoxysilane, methoxytrivinylsilane, tetravinylsilane, diethoxydivinylsilane, 2,4,6,8-tetravinyl-2,4,6,8-tetramethylcyclotetrasiloxane, and 2,4,6,8,10-pentamethyl-2,4,6,8,10-pentavinylcyclopentasiloxane.

In embodiments, the isolated polymers having at least a terminal group selected from (E) and (F), or (G) and (H), or combinations thereof, are used as macromonomers for copolymerization with one or more polymerizable monomers under anionic conditions, e.g., using an alkyllithium initiator. Examples of comonomers include vinylaromatic compounds, e.g., styrene, α-methylstyrene, para-methylstyrene, divinylbenzene, and the like; or acyclic dienes, e.g., butadiene, isoprene, piperylene and the like. Further, co-polymerizations of the DIAEA-based polymers can also be conducted under cationic (Lewis acidic) conditions with other polymerizable monomers such as terpenes, dienes, divinylarenes, etc.

In other embodiments, the polymers having at least a reactive terminal groups (E) and (F), or (G) and (H), or combinations thereof, can be suitably functionalized with a variety of functional groups, such as isocyanate, cyclic anhydride, carboxylic acid, carboxylic ester, or epoxy groups using methods known in the art.

Preparation of the Polymers:

The polymers can be prepared by polymerizing a DIAEA under cationic conditions in a suitable solvent in the presence of a catalyst. Examples of DIAEA include a diisopropenylbenzene (DIPEB), such as 1,3-diisopropenylbenzene, 1,4-diisopropenylbenzene, or mixtures thereof.

The two monomers can be added together to do the copolymerization or the monomers can be added sequentially to form the copolymers.

Suitable solvents include hydrocarbon solvents as they are generally inert to the catalyst and cationic intermediates generated during the polymerization. Examples include aromatic hydrocarbons, aliphatic hydrocarbons, or combinations thereof. Some specific examples include hexane, heptane, octane, isooctane, cyclohexane, varnish maker and painter's naphtha (VM&P naphtha), methyl-ethyl ketone (MEK), petroleum ether, toluene, xylene, and mixtures thereof.

Catalyst:

The catalyst can be either a Bronsted acid type or a Lewis acid type, or a catalyst having both Bronsted and Lewis acid type catalytic activity. In embodiments, the catalyst comprises a supported Bronsted acid, an unsupported Bronsted acid, a Lewis acid, a precursor thereof, or combinations thereof.

In embodiments, at least an electron donating additive, e.g., an organic ether, water and/or alcohol, is added forming complexes with the catalyst, with the additive concentration ranges from 0.1 to 10 or 0.1-5 or 0.5-4 or <7.5 or at least 1, as mol ratio of additive to catalyst.

In embodiments, the electron donating organic additive is selected from, ethane-1,2-diol (ethylene glycol), propane-1,2-diol (propylene glycol), 1,2-diethoxypropane, 2-(ethoxymethyl)tetrahydrofuran, 2,2'-(propane-2,2-diyl)bis(tetrahydrofuran), (methylsulfinyl)methane (dimethyl sulfoxide, DMSO), 2-aminoethanesulfonic acid (taurine), water, ethanol, isopropanol, butanol, hexanol, octanol, ethylene glycol butyl ether (EGBE), diethylene glycol butyl ether (DEGBE), diethylene glycol dibutyl ether (DEGDBE), tetraethylen glycol dimethylether, dipropylene glycol dimehtylether, polyethylene glycol (PEG), polypropylene glycol (PPG), and ethyl acetate or mixtures thereof.

Non-limiting classes of catalysts include organic acids, organic sulfonic acids, organic inorganic acids, acidic zeolites, any Lewis acid based on metals from Groups 3-8, and Groups 12-15 of the Periodic Table of the Elements, and mixtures thereof. The use of Lewis acid catalyst can lead to formation of polymer chains as well as facilitate disproportionation of the polymer chains, leading to improved solubility of the polymer.

Non-limiting examples of Bronsted acids include organic sulfonic acids, sulfuric acid, phosphoric acid, hypophosphoric acid, polyphosphoric acid, heteropolyacids, such as phosphotungstic acid and silicotungstic acid, 2,2,3-trichlorobutyric acid, 2,5-dichlorobenzene sulphonic acid, chlorosulphonic acid, methanesulfonic acid, p-toluenesulfonic acid, triflic acid, benzenesulphonic acid, 2,5-dichlorobenzenesulphonic acid, beta-naphthol-3,6,8-trisulphonic acid, sulphosalicylic acid, trifluromethanesulfonic acid, fluorinated organic sulfonic acid, and p-toluidine-m-sulphonic acid. Sulfonated solid acid derivatives can also be used, e.g., sulfonated styrene-divinylbenzenes, sulfonated silicas, sulfonated fluoropolymers and polystyrene supported sulfonic acids.

Solid inorganic acid catalysts based on silicon, silica, aluminum and alumina can also be used, e.g., (i) amorphous silica-alumina having a silica content of 0.1% to 99.9%, and/or a pore size of 0.1 ml/g to 5 ml/g, and/or a surface area (BET) of 100 to 1000 m$^2$/g, calcined at a temperature of 200° C. to 1000° C., (ii) phyllosilicates, such as natural or synthetic clays from the (a) kaolin group, e.g., kaolinite, halloysite, or dickite; (b) smectite group, such as montmorillonite, nontronite, hectorite, saponite, (c) celite/mica group, such as glauconite, muscovite, or paragonite; or (d) chlorite group, such as chamosite, cookeite, or nimite. The solid inorganic acid catalyst can be calcined at a temperature of 200° C. to 1000° C., and treated, washed, and activated with a mineral acid, or used in conjunction with a mineral acid (e.g., sulfuric acid or hydrochloric acid). Alternately, the solid inorganic acid catalyst can be modified in a water-based medium, by treatment or ion exchange, using salts of lithium, sodium, magnesium, or iron.

Other examples of solid inorganic acid catalysts include protonated or cationic forms of modified or pillared clays, such as natural or synthetic microporous aluminosilicates. Examples include materials from the zeolite group, such as USY, L, Mordenite, Ferrierite, ZSM-5 or ZSM-Beta, calcined at a temperature of 200° C. to 1000° C., and having a silica content of 0.1-99.9%, a pore size of 0.1-5 ml/g, and a surface area (BET) of 100 to 1000 m2/g.

Mesoporous materials in protonated or cationic forms can also be used. Examples include (a) silicoluminophosphates, such as SAPO-11, or SAPO-34; (b) aluminosilicates, such as MCM-41, or MCM-48; or (c) silicates such as SBA-15, or SBA-16, calcined at a temperature of 200° C. to 1000° C., and having one or more of a silica content of 0.1% to 99.9%, a pore size of 0.1 ml/g to 5 ml/g, and a surface area (BET) of 100 to 1000 m2/g.

Solid acid-supported metal systems, having metals such as Ni, Pt, Au, Fe, or Co can also be used. These materials can be obtained by treating a modified or pillared clay with a mineral acid, such as sulfuric acid or hydrochloric acid.

Any Lewis acid based on anu of zinc, boron, aluminum, gallium, indium, titanium, zirconium, tin, vanadium, arsenic, antimony, and bismuth can also be used as a catalyst. Examples include $AlCl_3$, (alkyl)$AlCl_2$, $(C_2H_5)_2AlCl$ and $(C_2H_5)_3Al_2Cl_3$, $BF_3$, $B(C_6F_5)_3$, $SnCl_4$, $TiCl_4$, $ZnCl_2$, $SnCl_2$, $CuCl_2$, and combinations. Complexes of the foregoing Lewis acids with Lewis bases can also be used. Metallocene halides, such as zirconocene dichloride, titanocene dicloride, or hafnocene dichloride; optionally in combination with an activator, such as methylalumoxane can also be used. Methylalumoxane by itself can also be used as a catalyst. In embodiments, the Lewis acid is selected from a boron halide, a tin halide, a titanium halide, and combinations thereof.

In embodiments, non-oxidizing Bronsted acids are used, which can prevent or minimize oxidation or oxidative degradation of the cyclic diene and/or the comonomer. Examples include perfluoroalkanesulfonic acids, such as $CF_3SO_3H$, $C_2F_5SO_3H$, and $C_6FsSO_3H$; perfluoroalkanoic acids, such as $CF_3CO_2H$; and alkanesulfonic acids, such as $CH_3SO_3H$, $C_2H_5SO_3H$, $C_6H_5SO_3H$, and the like.

In embodiments, the catalyst is a Lewis acid catalyst selected from: $AlCl_3$, $TiCl_4$, $SnCl_4$, $B(C_6F_5)_3$, $BF_3$ and complexes thereof with Lewis bases; methylalumoxane, metallocene halides and combinations thereof with methylalumoxane; and combinations thereof.

The concentration of the catalyst can influence the course of the polymerization. In embodiments, the catalyst amount ranges from 0.05 to 0.5 wt. %, or 0.1-0.4 wt. %, or 0.2-0.3 wt. %, or <0.5 wt., or <0.7 wt. % relative to the weight of the monomer.

Reaction Conditions:

Monomer addition can be carried out over a period ranging from 5 minutes to several hours, at a temperature of −100° to +120° C., or 0° to 120° C., or 30° C. to 100° C., or ambient temperature to 100° C., or 50° C. to 80° C. The reaction period can vary depending on the reactivity of the monomers. Longer reaction periods may be required at lower reaction temperatures. After all the monomer is added, the resulting reaction mixture can be stirred, if needed, for an additional period ranging from 5 minutes to several hours, or <5 hours, or <3 hours, until all the monomer has essentially disappeared, or alternately, until an analysis of the reaction mixture indicates that polymer of sufficient molecular weight has formed. In embodiments, the reaction temperature is from 30° C. to 120° C., or >45° C., or >65° C. The reaction can continue for stand-alone from 5 min-30 min.

In embodiments, the reaction can be conducted by adding the DIAEA monomer, or monomer mixture (if a comonomer is also included), to a mixture of the catalyst and solvent.

Such an order of addition can help prevent or minimize formation of undesirable gels. The polymerization can also be controlled by adjusting the monomer addition rate to maintain a relatively low concentration of the unreacted monomer in the reaction mixture of no more than 5 wt. %, relative to the total weight of the monomer.

Depending factors such as reaction solvent, temperature, and catalyst, the overall structure of the polymer, the molecular weight, and the relative proportion of the repeat units described previously can vary. The polymers produced can remain fully soluble in the solvent, partly soluble in the solvent, or mostly soluble in the solvent. Examples of solvents include aliphatic or alicyclic hydrocarbon solvents, and aromatic hydrocarbon solvents. Specific examples include toluene, xylene, alkylbenzenes, limonene, turpentine, or combinations thereof. It is preferred that the polymer remain soluble in the solvent.

At the end of the reaction, the polymer can be isolated by quenching the reaction mixture with water, followed by separating the organic solvent layer and stripping the solvent. Trace organics can be removed from the product under high vacuum.

The molecular weight of the polymer can be controlled by including a molecular weight control agent such as a mono-olefin. Examples of mono-olefins include styrene, α-methylstyrene, and combinations thereof.

Properties of the Polymers:

The polymers based on the DIAEAs are generally resinous materials. They have a good combination of molecular weight ranges and relatively broad molecular weight distributions (polydispersity index), which in part makes them more soluble in non-polar solvents, thereby enhancing their processibility.

In embodiments, the polymers have a number average molecular Mn of 1,000-20,000 Dalton, or 1,200-5,000 Daltons, or <5,000 Daltons, or 2,000-4,000 Daltons, or <10,000 Daltons, or >2,000 Daltons; a weight average molecular weight Mw of 3,000-70,000 Dalton, and a polydispersity index of 3.0 to 15.0 or 5 to 40 or 7 to 50 or <10.0, or >5.0. In embodiments, the polymers have a Mn of 2,000-8,000 Dalton, or 4,000-6,000 Dalton; a Mw of 8,000-48,000 Dalton, or 16,000-36,000 Dalton; and a polydispersity index of 5.0-10.0.

In embodiments, the polymers have a solubility in a hydrocarbon solvent of 25-75 wt. %, or 35-65 wt. %, or 40-50 wt. %, or >10 wt. %, relative to the weight of the solvent. Exemplary solvents include hexane, heptane, octane, isooctane, cyclohexane, varnish maker and painter's naphtha (VM&P naphtha), petroleum ether, toluene, xylene, and mixtures thereof.

In embodiment, the polymer solids when dissolved in the hydrocarbon solvent forms a substantially gel-free solution, wherein <15 wt. %, or <10 wt. %, or <5 wt. % of the solids remain insoluble in toluene (or cyclohexane). In another embodiment, the polymer solutions contain a low gel content of <5 wt. %, or 1-3 wt. %, or 0.05-2 wt. %, or <1 wt. % relative to the weight of the polymer. In embodiments with DiPEB and DiPEB-DVB (sequential polymerization), the amount of gel content is <1 wt. %, or <0.05 wt. %, or <0.01 wt. %. In embodiments with DiPEB/DVB combination copolymerization, the amount of gel is <3 wt. %, or <2 wt. %.

In embodiments, the polymer has a decomposition onset temperature of 200-450° C., or <600° C., or >300° C., or <500° C., with the polymer having <20 wt. % nonvolatile residual.

In embodiments, the polymers have a solubility in a hydrocarbon solvent at 25° C. of at least 10 wt. %, and a glass transition temperature (Tg) of 50° C.-300° C. or 50° C.-200° C. or 60° C.-175° C., or 70° C. −150° C., or <250° C., or <200° C., measured using DSC according to ASTM D3418 or DMA (dynamic mechanical analyzer).

The polymers also have good electrical properties, with a Dk (permittivity) of <2.5, or 1.5-2.5, or 1.2 to 2, measured at 1 and 20 GHz, according to ASTM D2520. The polymers also have a loss tangent (Df) of <0.0010, or <0.0008, or >0.0001, or 0.0002 to 0.0007, or 0.0003-0.0009, measured at 1 and 20 GHz, according to ASTM D2520.

In embodiments, the polymer has one or more properties including: a viscosity of 3,000-15,000 cP, measured on a 50 wt. % solution in cyclohexane at 25° C.; a viscosity of 100-1,200 cP, measured on a 50 wt. % solution in toluene at 25° C.; a moisture absorption coefficient of <0.05, measured at 25° C. according to ASTM D570; a permittivity (Dk) of <2.5, or 1.5-2.5, or from 1.2 to 2, and a loss tangent (Df) of less than 0.0010, or <0.0008 or >0.0001, 0.0002 to 0.0007, or 0.0003-0.0009, with Dk and Df measured at 1 and 20 GHz, according to ASTM D2520.

In embodiments, the polymers have a density of >0.9 g/cc, or 1.0 g/cc, or 1.0-1.20 g/cc, or 1.0-1.10 g/cc. The overall density reflects the relative proportions of step growth and chain growth processes that occur during the polymer preparation step.

Applications:

The DIAEA-based polymers are amorphous (non-crystalline) materials, which can be used to make transparent polymer compounds for applications such as lenses in lighting applications, such as high brightness LEDs used in TV backlighting, traffic lights and automotive lights, and general lighting purposes. Due to the high Tg, the polymers can withstand high operating temperatures in high power LED applications.

The DIAEA-based polymers are characterized as having double bonds that are valuable for further manipulation. For example, the double bonds are reactive to crosslinking agents, which allows for preparing crosslinked polymers, curable compositions and cured compositions for various end uses including electronic applications.

Curable and Cured Compositions Based on the DIAEA-Based Polymers:

The DIAEA-based polymer can be used for curable compositions, which in addition to the DIAEA-based polymer, the curable composition further comprises a rubbery polymer, at least a crosslinking agent, a curing initiator, and optionally an accelerant. The curable composition can also include one or more fillers, e.g., ceramic powders. Crosslinked compositions having varying degrees of toughness and flexibility can be produced from the curable compositions.

In embodiments, the amount of DIAEA-based polymer ranges from 40-90 wt. %, or >50 wt. %, or >55 wt. %, or <80 wt. %, based on the total weight of the curable composition. The curable composition typically comprises 25-50 wt. %, or >30 wt. % rubbery polymer, based on the total weight of the composition. Crosslinking agent(s) are typically used in amounts of 2-20 wt. %, or 3-15 wt. %, or >5 wt. %. Other components, e.g., curing initiator, accelerant, etc. are typically present in amounts of 0.5-10 wt. %, or 1-5 wt. %, or >2 wt. %.

Examples of crosslinking agents include sulfur-based agents, polysulfide polymers, and di-isocyanates. Examples of sulfur-based crosslinking agents include thiols and compounds having mercapto (SH) groups, elemental sulfur, and sulfur donor compounds that liberate sulfur under the crosslinking conditions.

Examples of accelerants include dibenzothiazole, N-cyclohexyl-2-benzothiazole, N-cyclohexyl-2-benzothiazole sulfenamide (CBS), thiocarbamyl sulfenamide, 2-(4-morpholinothio)-benzothiazole (MBS), 2-2'-dithiobis(benzothiazole) (MBTS), tetramethylthiuram disulfide (TMTD), dipentamethylene thiuram tetrasulfide (DPTT), 4,4'-dithiodimorpholine (DTDM), zinc dimethyl dithiocarbamate, thiourea, xanthates, and thiophosphates.

Examples of crosslinking agents include trithiocyanuric acid (1,3,5-triazine-2,4,6(1H,3H,5H)-trithione-TTCA), 4,4'-thiodibenzenethiol (TDT), tris[2-(3-mercaptopropionyloxy)ethyl]isocyanurate (TMPEIC), pentaerythriotol tetra (3-mercaptopropionate) (PETMP), trimethylolpropane triacrylate (TMPTA), trimethylolpropane trimethylmethacrylate (TMPTMA), 1,3-bis(succinimidyl)benzene (PCM), triallyl isocyanute (TAICROS), trimethallyl isocyanurate (TAICROS M), 2,4,6-triallyloxy 1,3,5-triazine (TAI), divinyl benzene (DVB), diisopropenylbenzene (DIPEB), and combinations thereof.

Suitable initiators include thiols or peroxide-based initiators, e.g., inorganic or organic peroxides, such as, hydroperoxides and liquid peroxydicarbonates, dialkyl peroxides, diperoxyketals, monoperoxy carbonates, cyclic ketone peroxides, diacyl peroxides, organosulfonyl peroxides, and peroxyesters.

The rubbery polymer includes both natural rubber and its various raw and reclaim forms, as well as various synthetic rubbers. In embodiments, the rubber component comprises any of unsaturated, partially hydrogenated, and fully hydrogenated styrenic block copolymers, unsaturated diene elastomer selected from polybutadienes, natural rubber, synthetic polyisoprenes, butadiene copolymers, isoprene copolymers, EPDM rubbers, styrenic rubbers, such as styrene-butadiene rubbers (SBR); chloroprene rubbers, chlorinated polyethylenes, brominated butyl rubbers, polybutene HR (Highly Reactive), anhydride-functionalized diene rubbers, and combinations thereof.

In embodiments, the rubbery polymer is selected from butyl rubber, halogenated butyl rubber, and EPDM (Ethylene Propylene Diene Monomer rubber), and mixtures thereof. In another embodiment, the rubber component is selected from natural rubber (NR), styrene-butadiene rubber (SBR), butadiene rubber, synthetic polyisoprene rubber, epoxylated natural rubber, polybutadiene rubber, e.g., high-cis polybutadiene rubber; ethylene propylene diene monomer rubber, ethylene propylene rubber, maleic acid-modified ethylene propylene rubber, butyl rubber, isobutylene-aromatic vinyl or diene monomer copolymers, brominated-NR, chlorinated-NR, brominated isobutylene p-methylstyrene copolymer, chloroprene rubber, epichlorohydrin homopolymers rubber, epichlorohydrin-ethylene oxide or allyl glycidyl ether copolymer rubbers, epichlorohydrin-ethylene oxide-allyl glycidyl ether terpolymer rubbers, chlorosulfonated polyethylene, chlorinated polyethylene, maleic acid-modified chlorinated polyethylene, methylvinyl silicone rubber, dimethyl silicone rubber, methylphenylvinyl silicone rubber, polysulfide rubber, vinylidene fluoride rubbers, tetrafluoroethylene-propylene rubbers, fluorinated silicone rubbers, fluorinated phosphagen rubbers, styrene elastomers, thermoplastic olefin elastomers, polyester elastomers, urethane elastomers, and polyamide elastomers.

Examples of styrene elastomers include hydrogenated, partially hydrogenated, and un-hydrogenated styrenic block copolymers (SBCs), e.g., diblock SBCs and triblock SBCs.

Examples of SBRs include an emulsion-polymerized styrene-butadiene rubber (un-modified E-SBR), a solution-polymerized styrene-butadiene rubber (un-modified S-SBR) and modified SBRs obtained by modifying terminals (modified E-SBR and S-SBR). The rubber component can comprise components other than SBR and BR such as natural rubber (NR), isoprene rubber (IR), epoxidized natural rubber (ENR), butyl rubber, acrylonitrile butadiene rubber (NBR), ethylene propylene diene rubber (EPDM), chloroprene rubber (CR) styrene-isoprene-butadiene rubber (SIBR), used alone or in combinations.

The rubber component can be any of a star-branched, branched, and/or functionalized with a coupling agent and/or star-branching or functionalization agent. Examples include branched ("star-branched") butyl rubber, halogenated star-branched butyl rubber, poly(isobutylene-co-p-methylstyrene), brominated butyl rubber, chlorinated butyl rubber, star-branched polyisobutylene rubber, and mixtures thereof.

Crosslinking of the polymer chains can be achieved by reaction with the crosslinking agent at temperatures ranging from ambient to 300° C. to provide crosslinked polymers. The crosslinking density depends on several factors, such as the amount of the crosslinking agent, temperature and other physical conditions used. Crosslinking can also be achieved photochemically using photoinitiators.

The polymers based on DIAEA can also be reactively blended with other reactive polymers having unsaturation centers to provide a variety of novel materials. The reactive polymers can be selected to achieve the desired combination of physical properties and performance characteristics. Reactive extrusion can be used to make block copolymers where the individual blocks have distinctly different properties. For example, a soft block of a diene polymer, such as polybutadiene or polyisoprene can be attached to the DIAEA polymer block to provide block copolymers having a combination of both rigid blocks and soft blocks. Such approaches can also be used to introduce functional groups at the termini of the polymers, such as isocyanate, cyclic anhydride, carboxylic acid, carboxylic ester, or epoxy groups.

Properties of the Cured Compositions:

The crosslinked polymer is characterized as having good chemical and oxidative stability. Crosslinking also results in raising the Tg of the resulting crosslinked polymer. The cured compositions have enhanced fire retardancy, useful for electronic applications. Crosslinked polymers and cured compositions with sulfur-based crosslinking agents exhibit better fire retardancy than pre-crosslinked polymers. Fire retardance can be measured based on UL or other methods, e.g., measuring the time taken by a sample to completely form char from the time sample ignition is started. Crosslinking not only allows for producing materials having enhanced toughness, but also provides access to materials having the desired balance of toughness and flexibility.

The cured compositions have good adhesion to metals such as aluminum, copper, etc. In embodiments, the cured composition has a 180° peel strength of 0.1-1.0 N/m, or 0.3-0.7 N/m. Good adhesion to copper makes the compositions valuable in electronic applications.

The cured compositions are valuable as electrical insulating materials. In embodiments, the cured composition has at least one of: a 180° peel strength to copper of from 0.1 to 1.0 N/m, a Df of 0.0010, or <0.0008 or >0.0001, 0.0002 to 0.0007 or from 0.0003-0.0009, measured according to IPC™-650 2.5.5.13; a Dk of from 2.5, or from 1.5-2.5, or from 1.2 to 2, measured according to IPC™-650 2.5.5.13; a UL94 fire retardance of V0 or V1; a coefficient of thermal expansion (CTE) of from 5-25 ppm/° C. in the XY plane, and from 30-100 ppm/° C. in the Z direction, measured using DMA over a temperature range of from −50° C. to 300° C.; and moisture absorption of 0.02% to 0.2%, measured according to ASTM D570.

Uses of the Cured Compositions:

The cured polymer composition is valuable for use as metal-clad laminates, e.g., copper clad laminates (CCL), electrical appliance housings, electrical cables, electrical connectors, electronic switches, and electronic components, such as printed circuit boards (PCBs), printed wiring boards, and flexible printer circuits (FPC).

Prepregs, which are used for making the PCBs, can be made using the crosslinked polymers in combination with a rubber component, optionally additives selected from glass fibers, glass beads, ceramic powder, silica, or combinations thereof. In embodiments, fiber glass is pre-treated with an organosiloxane having Si—H bond(s), e.g., a polyalkylsiloxane or a polyarylsiloxane, to increase adhesion between the fiber glass and the DIAEA-based polymer.

Inclusion of a ceramic powder can further reduce the Df while increasing the flexural strength and maintaining low water uptake. The amount can be adjusted to achieve an increased flexural strength without adversely affecting the crosslink density of the cured polymer matrix. In embodiments, the weight ratio of the ceramic powder to the polymer is up to 0.5. Examples include materials containing lithium titanate, e.g., $Li_2TiO_3$—MgO—LiF; lithium zirconate, lithium titanate—zirconate, lithium tungstate, barium titanate, or combinations thereof Copper clad laminates (CCL) are formed by laminating the crosslinked polymer or the cured composition onto a copper substrate, with properties such as a low to negligible level of blistering or delamination after subjecting the laminate to a pressure cooker test; low to negligible decomposition during lead-free soldering, chemical resistance against acid, alkaline and oxidative substances, low to negligible water uptake, good resistance against inner laminate electromigration, i.e., resistance to CAF (conductive anodic filament) failure, low coefficient of thermal expansion (CTE), an adequately high glass transition temperature for stable performance under use conditions, low electrical properties, Df and Dk, stable and high adhesion to metals under use conditions, low to negligible impact on polymer resin flow of prepregs for press process, and satisfactory optical qualities, e.g., no agglomerates of the laminate material.

In embodiments, the CCL can include a metal foil disposed on one or both sides of an insulating layer made from the cured composition. Further, the CCL can include a barrier layer disposed at a side of the surface in contact with the insulating layer. The barrier layer can contain a metal such as cobalt, capable of reducing the transmission loss.

The barrier layer can be formed by a plating process, e.g., sputtering, electroplating or electroless plating. A stacked laminate of the desired thickness can be produced by stacking the individual laminates and subjecting them to heating, e.g., at temperatures ranging from 110° C. to 220° C., and pressures e.g., 0.5 MPa to 20 MPa, or 1.5 MPa to 5 MPa, for a period ranging from 10 min to 5 h.

EXAMPLES

Example 1. 1,3-DIPEB Polymerization with $AlCl_3$ in Toluene 350 g of dry toluene was added to 1 liter flask equipped with a stir rod & a stir paddle, and heated to 45° C. over 10 min with stirring at 300 RPM under nitrogen flow. 10 g of anhydrous $AlCl_3$ was added under stirring with the container rinsed with 50 g of toluene. After 10 minutes at 45° C., 250 g of 1,3-DIPEB was added over 30 min with reaction maintained at 45±2° C. The stirring rate was increased to 450 RPM, and final reaction mixture was very thick and became a gel. After being held at 45° C. for 1 hr, the reaction mixture was quenched with 150 mL of deionized $H_2O$ containing 4 grams of 85% $H_2SO_4$, and then heated up to 80° C. over 15 min. After 20 min at 80° C. under constant stirring, the reaction mixture allowed to phase separate over 15 min. The bottom aqueous layer was removed with a pipette. Stirring of the remaining top layer was resumed at 300 RPM, and 150 mL $H_2O$ having 4 grams of 85 wt % $H_2SO_4$ was added, and the mixture heated to 80° C., and stirred at 300 RPM for 20 min. The phases was allowed to separate with a bottom aqueous layer, which was removed using a pipette. A third wash of the top layer was made using 150 mL $H_2O$ with 4 grams of 85 wt % $H_2SO_4$ as described above. After removing the aqueous layer, the organic layer was quenched with 150 mL of $H_2O$ containing 0.8 g $Na_2CO_3$, and then heated to 80° C. for 20 min with stirring, the layers were allowed to settle for 10 min and the bottom aqueous layer was removed. The resulting organic layer was quenched with aqueous $Na_2CO_3$ using the same process as above. The organic layer was poured into 3 liters of chilled acetone under stirring to precipitate out the polymer product. The solids were filtered with a 110 mm Buchner funnel using a qualitative filter paper. 171.48 g of a wet mass was collected which after being dried in a constant vacuum oven at 0.1 mm Hg and 180° C. provided 133.2 g (53.3% yield) of the polymer.

The product was analyzed for iodine value (for degree of olefinic unsaturation present in the polymer), Tg, gel content, and molecular weight of THF-soluble material (using GPC). Results show an iodine value of 3.3 cg 1/g, a Mn of 3,087, a Mw of 44,926 for the THF-soluble material; a PDI of 14.6, a Tg of 185.2° C., and gel content of 60 wt. %.

Example 2. 1,3-DIPEB Polymerization with Triflic Acid in Toluene

Example 1 was repeated, except that the amount of dry toluene is 1,068 g, the amount of 1,3-DIPEB is 125 g and 1.35 g of trifluoromethanesulfonic acid (triflic acid). The final dry mass from the reaction was 39.08 g for a yield of 33.75%. The final product had an iodine value of 2.4 cg 1/g, a Mn of 6,114, a Mw of 56,633 for the THF-soluble material; a PDI of 9.26, a Tg of 222.7° C., and gel content of 7.4 wt. %.

Example 3. 1,3-DIPEB Polymerization with Triflic Acid in Cyclohexane

Example 1 was repeated, except that the amount of dry cyclohexane is 389.3 g, the amount of 1,3-DIPEB is 105 g, and 0.7 g of trifluoromethanesulfonic acid (triflic acid). The wet mass (157.87 g) recovered from the Roto-vapor was placed in a vacuum oven at 180° C. under 0.1 mm Hg. After being dried for 2 h and 20 min, 103.56 g (98.63% yield) of the polymer was obtained as a dry mass.

The final product had an iodine value of 1.5 cg 1/g, a Mn of 2,433, a Mw of 24,285 for the THF-soluble material; a PDI of 9.98, a Tg of 215.8° C., and 2.8 wt. % gel content.

Example 4. 1,3-DIPEB Polymerization with Triflic Acid in Cyclohexane

Example 1 was repeated, except that the amount of dry cyclohexane is 928.4 g, the amount of 1,3-DIPEB is 250 g, and 0.25 g of trifluoromethanesulfonic acid (triflic acid). The dry mass recovered from the vacuum oven weighed 250.57 g (100.2%).

The final product had an iodine value of 5.5 cg 1/g, a Mn of 2,303, a Mw of 29.524 for the THF-soluble material; a PDI of 6.00, a Tg of 199.8° C., <0.01 wt. % gel content.

Example 5. 1,3-DIPEB Polymerization with Triflic Acid in Cyclohexane

Example 1 was repeated, except that the amount of dry cyclohexane is 927 g, the amount of 1,3-DIPEB is 250 g, and 0.25 g of trifluoromethanesulfonic acid (triflic acid). The wet mass recovered (322.97 g) was dried for 4 h in a vacuum oven at 180° C. under 0.1 mm Hg. The dry mass recovered from the vacuum oven weighed 238.38 g (95.4% yield).

The final product had an iodine value of 17.3 cg 1/g, a Mn of 1.989, a Mw of 26,099 for the THF-soluble material; PDI of 13.10, a Tg of 200.4° C., <0.01 wt. % gel content.

Example 6. 1,3-DIPEB Polymerization with Triflic Acid in Cyclohexane

Example 1 was repeated, that the amount of dry cyclohexane is 927 g, the amount of 1,3-DIPEB is 250 g, and 0.25 g of trifluoromethanesulfonic acid (triflic acid). The wet mass (245.7 g) remaining was dried in a vacuum oven set at 180° C. under 0.1 mm Hg for 4 h. The resulting dry mass weighed 249.6 g (99.8% yield).

The final product had an iodine value of 9.5 cg 1/g, a Mn of 1,660, a Mw of 14,080 for the THF-soluble material; a PDI of 8.47, a Tg of 200.0° C., <0.01 wt. % gel content.

Example 7. 1,3-DIPEB Polymerization with Triflic Acid in Cyclohexane

Example 1 was repeated, except that the that the amount of dry cyclohexane is 927 g, the amount of 1,3-DIPEB is 250 g, and the amount of trifluoromethanesulfonic acid (triflic acid) catalyst is 0.125 g.

The wet mass (245.7 g) remaining was dried in a vacuum oven set at 180° C. under 0.1 mm Hg for 4 h. The resulting dry mass weighed 249.6 g (99.8% yield).

The final product had an iodine value of 21.6 cg 1/g, a Mn of 2,953, a Mw of 80,167 for the THF-soluble material; a PDI of 27.15, a Tg of 195.9° C., <0.01 wt. % gel content.

Example 8. 1,3-DIPEB Polymerization with Triflic Acid in Cyclohexane

Example 1 was repeated, except that the amount of dry cyclohexane is 1179 g, the amount of 1,3-DIPEB is 250 g, and 0.125 g of triflic acid. In Example 8, catalyst added to heated mixture of 1,3-DIPEB and cyclohexane. The wet mass (245.7 g) remaining was dried in a vacuum oven set at 180° C. under 0.1 mm Hg for 4 h. The resulting dry mass weighed 249.6 g (99.8% yield).

The final product had an iodine value of 37.2 cg 1/g, a Mn of 2,161, a Mw of 58,088 for the THF-soluble material; a PDI of 26.89, a Tg of 67.3° C., <0.01 wt. % gel content.

Example 9. 1,3-DIPEB Polymerization with Triflic Acid in Cyclohexane

Example 1 was repeated, except that the amount of dry cyclohexane is 927 g, the amount of 1,3-DIPEB is 250 g, and 0.25 g of trifluoromethanesulfonic acid (triflic acid). The wet mass (245.7 g) remaining was dried in a vacuum oven set at 180° C. under 0.1 mm Hg for 4 h. The resulting dry mass weighed 249.6 g (99.8% yield).

The final product had an iodine value of 53.4 cg 1/g, a Mn of 1,107, a Mw of 4,792 for the THF-soluble material; a PDI of 4.33, a Tg of 66.02° C., <0.01 wt. % gel content.

Example 10. 1,3-DIPEB Polymerization with Triflic Acid in Cyclohexane

Example 1 was repeated, except that the amount of dry cyclohexane is 198 g, the amount 1,3-DIPEB is 42 g, and 0.25 g of trifluoromethanesulfonic acid (triflic acid). The wet mass (245.7 g) remaining was dried in a vacuum oven set at 180° C. under 0.1 mm Hg for 4 h. The resulting dry mass weighed 249.6 g (99.8% yield).

The final product had an iodine value of 10.9 cg 1/g, a Mn of 1,520, a Mw of 5,024 for the THF-soluble material; a PDI of 3.31, a Tg of 173.3° C., <0.01 wt. % gel content.

Examples 11-12. Electrical Properties of Polymer Compositions Comprising Poly(1,3-DIPEB Two compositions, example 11 containing 80 wt. % of the poly(1,3-DIPEB) of Example 5 and example 12 containing 20 wt. % of KRATON™ G1652, were prepared. KRATON™ G1652 and KRATON™ G1652MU are selectively hydrogenated S-EB-S block copolymers available from Kraton Polymers.

Examples A-F

Plaques were prepared from the polymer compositions of example 11 (Examples A-C) and example 12 (Examples D-F) by thermal compression. The plaques were measured at room temperature using the Split Cavity technique, which is a resonant technique that measures the dielectric constant Dk and Df at a single frequency (the resonance peak), which varies with dielectric properties and sample thickness.

Examples A-C plaques have an average thickness (mm) of 0.620, 0.686.0 and 0.830 respectively. Examples D-F have an average thickness (mm) of 3.005, 2.788 and 2.895 respectively. Examples A-C plaques have an average Dk of 2.20, an average Df ($\times 10^{-4}$) of 8.20, measured at an average frequency of 18.98 GHz. Examples D-F plaques have an average Dk of 2.27 and an average Df ($\times 10^{-4}$) of 3.60 measured at an average frequency of 15.87 GHz.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

Unless otherwise specified, all technical and scientific terms used herein have the same meanings as commonly understood by one of skill in the art to which the disclosed disclosure belongs. the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A polymer comprising a combination of repeat units (A), (B), (C) and (D):

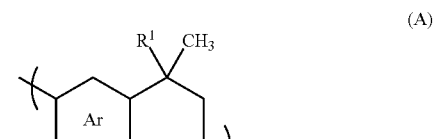

(A)

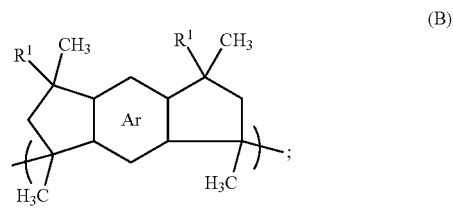

(B)

-continued

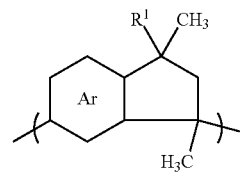
(C)

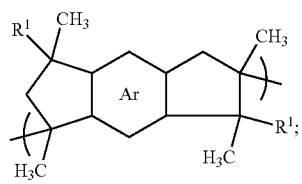
(D)

wherein R¹ is a H, C1-C8 alkyl group;

wherein Ar is an arene ring;

wherein the polymer has a solubility in a hydrocarbon solvent at 25° C. of at least 10 wt. °;

wherein the polymer has a $T_g$ of from 50° C. to 300° C., measured using DSC according to ASTM D3418;

wherein the polymer forms a substantially gel-free solution in a hydrocarbon solvent; and wherein the polymer has a weight average molecular weight of 8,000 to 70,000 Dalton, measured according to ASTM D5296.

2. The polymer of claim 1, wherein R¹ is methyl, ethyl, isopropyl, or n-butyl.

3. The polymer of claim 1, wherein said polymer comprises at least one terminal group selected from structures (F), (F), (G) and (H):

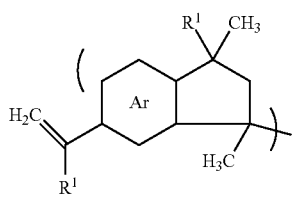
(E)

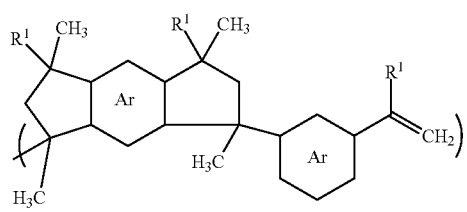
(F)

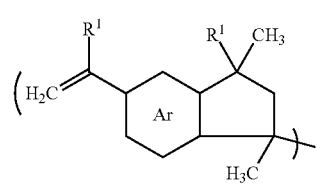
(G)

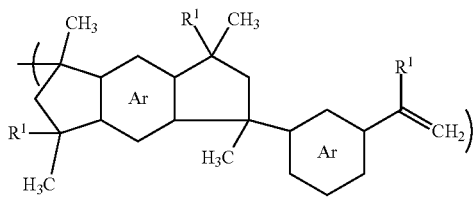
(H)

wherein R¹ is H or a C1-C8 alkyl group, and wherein Ar is an arene ring.

4. The polymer of claim 1, having one or more of
a viscosity of 3,000 to 15,000 cP, measured on a 50 wt. % solution in cyclohexane at 25° C.;
a viscosity of 50 to 1200 cP, measured on a 50 wt. % solution in toluene at 25° C.;
a viscosity of 5 to 100 cP, measured on a 15 wt. % solution in toluene at 25° C.;
a Tg of 50-300° C. measured using DSC according to ASTM D341;
a moisture absorption coefficient of less than 0.05, measured at 25° C. according to ASTM D570;
a permittivity (Dk) of 2-2.5, according to ASTM D2520; and
a loss tangent (Df) of 0.0001-0.002, according to ASTM D2520.

5. The polymer of claim 1, further comprising structural units derived from a comonomer selected from:
(i) a cyclodiene or a dimer thereof;
(ii) a divinylarene other than the diisoalkenylarene of formulas (I (ii) or combinations thereof;
(iii) an adduct of a cyclodiene and an acyclic diene;
(iv) an allyl compound having two or more allyl groups;
(v) a vinyl compound other than the divinylarene (ii) and having two or more vinyl groups;
and any combination thereof.

6. The polymer of claim 1, wherein said polymer is obtained by electrophilically polymerizing in the presence of a Bronsted acid or a Lewis acid catalyst, a monomer comprising any of a 1,3-diisoalkenylarene (I), a 1,4-diisoalkenylarene (II), or mixtures thereof

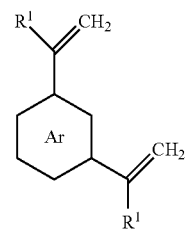
(I)

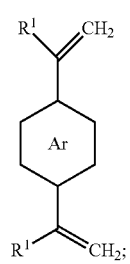
(II)

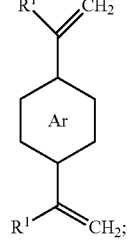

wherein R¹ is H or a C1-C8 alkyl group, and
wherein Ar is an arene ring.

7. The polymer of claim 5, wherein the cyclodiene is a 1,3-cyclohexadiene.

8. The polymer of claim 5, wherein the cyclodiene is a 1,3-cyclodiene dimer comprising vinyl norbornene.

9. The polymer of claim 6, wherein the polymerizing is conducted in a hydrocarbon solvent selected from an aliphatic hydrocarbon, an aromatic hydrocarbon, and combinations thereof.

10. The polymer of claim 6, wherein said polymerizing comprises adding the monomer to a solution of the Bronsted acid or Lewis acid catalyst in the hydrocarbon solvent, at a reaction temperature of −100° C. to 120° C.

11. The polymer of claim 10, wherein the Bronsted acid or Lewis acid catalyst is present in an amount of <0.7 wt. % of the weight of the monomer.

12. The polymer of claim 10, wherein the Bronsted acid or Lewis acid catalyst is mixed with at least an electron donating additive at a 1:10 to 10:1 mole ratio to form complexes.

13. The polymer of claim 12, wherein the electron donating additive is any of an organic ether, water and alcohol, and mixtures thereof.

14. The polymer of claim 13, wherein the electron donating additive is selected from ethane-1,2-diol (ethylene glycol), propane-1,2-diol (propylene glycol), 1,2-diethoxypropane, 2-(ethoxymethyl)tetrahydrofuran, 2,2'-(propane-2,2-diyl)bis(tetrahydrofuran), (methylsulfinyl)methane (dimethyl sulfoxide, DMSO), 2-aminoethanesulfonic acid (taurine), water, ethanol, isopropanol, butanol, hexanol, octanol, ethylene glycol butyl ether (EGBE), diethylene glycol butyl ether (DEGBE), diethylene glycol dibutyl ether (DEGDBE), tetraethylen glycol dimethylether, dipropylene glycol dimethylether, polyethylene glycol (PEG), polypropylene glycol (PPG), ethyl acetate, and mixtures thereof.

15. The polymer of claim 6, wherein said polymerizing comprises controlling the monomer addition rate to maintain an unreacted monomer concentration of no more than 5 wt. %, relative to the total weight of the monomer.

16. A curable composition comprising the polymer of claim 1, one or more rubbery polymers, one or more crosslinking agents, and optionally one or more curing initiators.

17. A cured composition obtained from the curable composition of claim 16, wherein the cured composition has one or more of:
 a 180° peel strength to copper of from 0.1 to 1.0 N/m,
 a dissipation factor (Df) of from 0.0005 to 0.005, according to ASTM D2520,
 a dielectric constant (Dk) of from 2.2 to 2.8, according to ASTM D2520,
 a UL94 fire retardance of V0 or V1,
 a coefficient of thermal expansion of from 5-25 ppm/° C. in the XY plane, and from 30-100 ppm/° C. in the Z direction, measured with DMA over a temperature range of from −50° C. to 300° C.; and
 a moisture absorption of 0.02% to 0.2%, measured according to ASTM D570.

18. A prepreg comprising the cured composition of claim 17.

19. A polymer composition obtained by electrophilically polymerizing in the presence of a Bronsted acid or a Lewis acid catalyst, a monomer comprising any of a 1,3-diisoalkenylarene (I), a 1,4-diisoalkenylarene (II), or mixtures thereof:

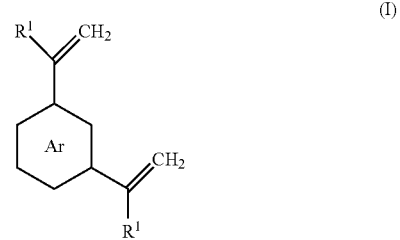

(I)

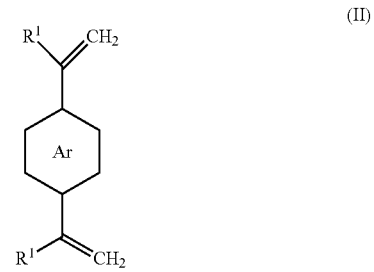

(II)

wherein $R^1$ is H or a C1-C8 alkyl group;

wherein Ar is an arene ring;

wherein the polymer has a solubility in a hydrocarbon solvent at 25° C. of at least 10 wt. and forms a substantially gel-free solution in a hydrocarbon solvent;

wherein the polymer has a $T_g$ of 50° C. to 300° C., measured using DSC according to ASTM D3418; and wherein the polymer has a weight average molecular weight Mw of 8,000 to 70,000 Dalton, measured according to ASTM D5296.

20. The polymer composition of claim 19, wherein said composition comprises a polymer comprising a combination of repeat units (A), (B), (C) and (D)

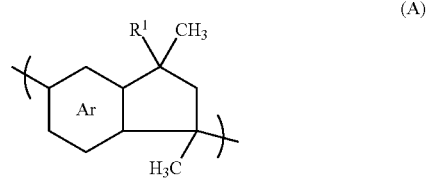

(A)

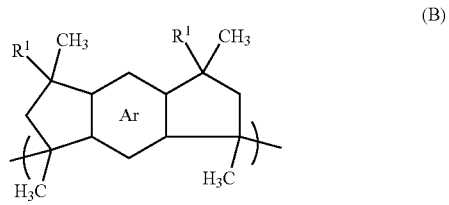

(B)

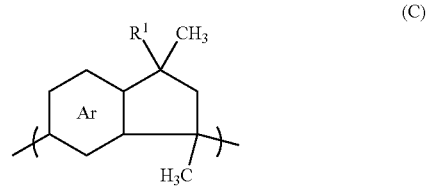

(C)

-continued
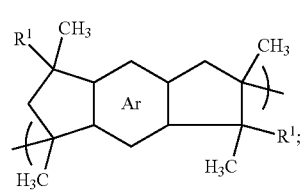
(D)
wherein R¹ is H or a C1-C8 alkyl group, and wherein Ar is an arene ring.
* * * * *